J. YOUNG.
Improvement in the Process and Apparatus for the
Manufacture of Carbonate of Soda.
No. 130,174. Patented Aug. 6, 1872.

Scale, ¼ in = 1 foot.

John Brown Witness
John C Macandie Witness

James Young

UNITED STATES PATENT OFFICE.

JAMES YOUNG, OF KELLY, NORTH BRITAIN.

IMPROVEMENT IN PROCESSES AND APPARATUS FOR THE MANUFACTURE OF CARBONATE OF SODA.

Specification forming part of Letters Patent No. 130,174, dated August 6, 1872.

SPECIFICATION.

I, JAMES YOUNG, of Kelly, in the county of Renfrew, North Britain, have invented "Improvements in the Manufacture of Carbonate of Soda, and in the recovery of materials employed therein," of which the following is a specification:

This invention relates to improvements in the manufacture of carbonate of soda, and in the recovery of ammonia and carbonic acid from the materials employed therein.

*Description of Drawing.*

In carrying out these improvements I place common salt and water in an air-tight vessel, and to this a solution of ammonia is added; or the ammonia may be distilled from a separate vessel and passed through a pipe into the vessel containing the salt and water, which acts as the receiver. Into the vessel containing the salt a stream of carbonic acid is sent through a pipe, either simultaneously with the ammonia or after it, which, acting with the salt and ammonia, produces bicarbonate of soda and solution of muriate of ammonia. The solution of muriate of ammonia is run off through a pipe or close filter into an ammonia-still so as to be used to produce ammonia by the usual process for a repetition of the operation. The bicarbonate of soda may be washed with water, a solution of common salt, or other salt of soda, to remove adhering or mixed muriate of ammonia, and then heated or boiled with water; or steam may be blown into it to drive off carbonic acid and residual compounds of ammonia. These compounds of ammonia are used in the production of another quantity of bicarbonate of soda, while the carbonate of soda already formed remains in the vessel. It is obvious that various arrangements of apparatus may be used in effecting the objects of this invention, but one arrangement found to answer the purpose is illustrated on the sheet of drawing hereunto appended, in which—

Figure 1:
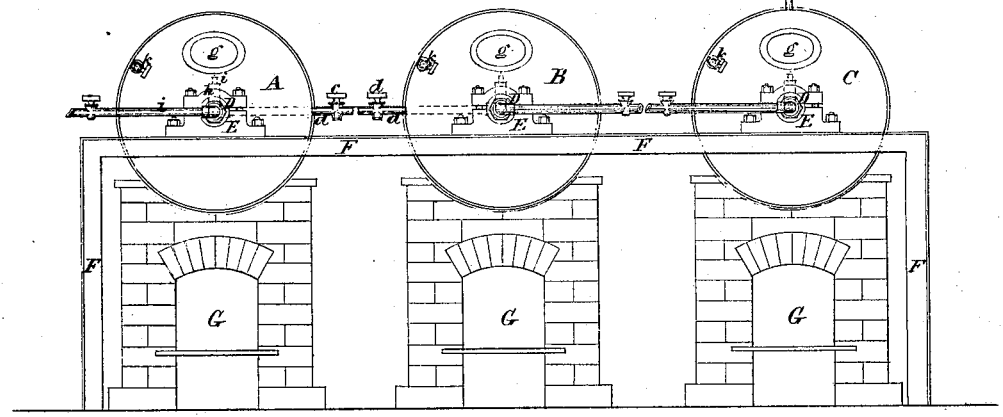
Figure 1 is an end elevation.
Figure 2:
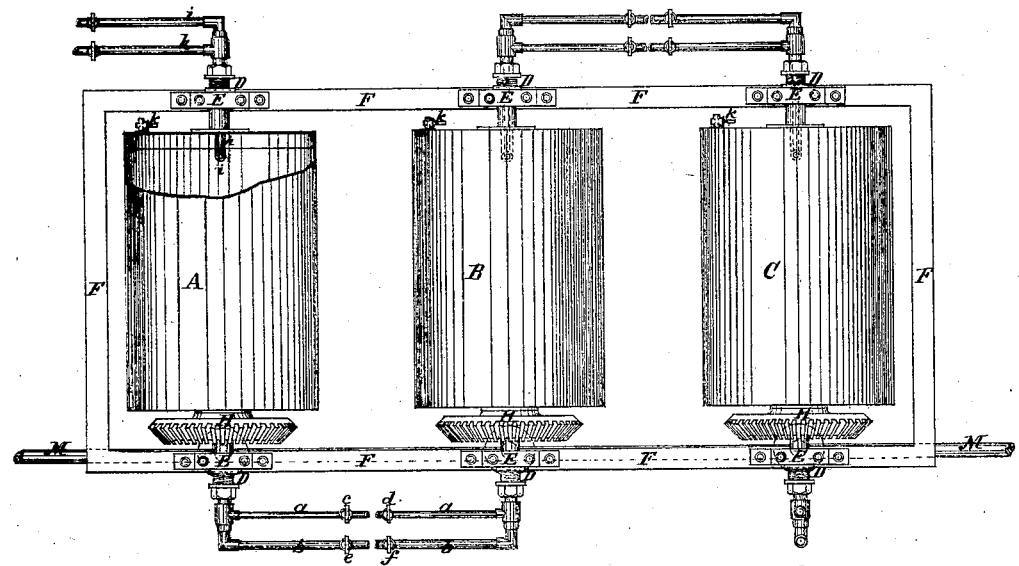
Fig. 2, a plan.
Figure 3:
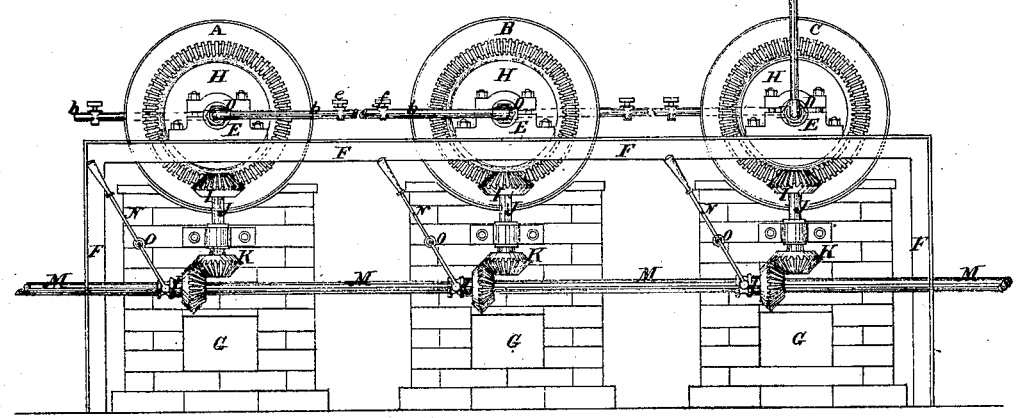
Fig. 3, an elevation of the end of the apparatus opposite to that shown by Fig. 1. The apparatus illustrated by these figures consists of three cylindrical air-tight iron vessels, A, B, and C, each of which is carried by journals D, fitted so as to revolve in bearings E fixed on the framing F. Beneath each of the cylindrical vessels A, B, and C, a fire-grate, G, is situated, and at one end of each such vessel a bevel-wheel, H, is attached. The wheels H are in gear with bevel-pinions I, carried on short vertical shafts J, each of which has at its lower end another bevel-pinion, K, in gear with similar bevel-pinions, L, on the horizontal shaft M. The pinions L are provided with levers N, movable on studs O, by which the pinions L are thrown out of or into gear with the pinions K, when required. By means of the combination of mechanism now described, it follows that whenever rotary motion is communicated to the shaft M at the same time any of the vessels A, B, or C which are in gear are caused to revolve. In employing this apparatus for the purposes of the invention it is advantageous at all times to have any two of the vessels A, B, or C in communication with each other by means of the pipes, which pass through the hollow journals D of any one of the vessels to the hollow journals of any other of the vessels. For the sake of simplicity in description it is assumed that the vessels A and B are in communication by the pipes $a$ and $b$, provided with stop-cocks $c$, $d$, $e$, and $f$.

In commencing to manufacture the carbonate of soda the door $g$ in the end of the vessel A is removed and a quantity of salt and water, or solution of salt in the proportions of one hundred parts of salt to three hundred parts of water, by weight, is charged thereinto through the door-way, which is afterward closed air-tight by the door $g$ being replaced, care being taken that the quantity of liquid is such that its surface is well below the ends of the pipes $h$ and $i$, which may be turned upward inside the vessel A, as shown. The pipe $h$ is in communication with an ammonia-still, (not shown in the drawing,) and the ammonia, in the proportion of thirty-five parts, by weight, to the hundred parts of salt, (calculating the ammonia as pure ammoniacal gas,) is now admitted into the vessel A through the pipe $h$ connecting it with the ammonia-still. I mention the foregoing proportions of water, salt, and ammonia as quantities which I find to succeed in practice, but I do not limit myself to them, as they may be varied to a considerable extent. A stream of carbonic-acid gas, preferably obtained by separating it from the carbonate of soda heated with water or steam, or from carbonate of lime heated to redness in a retort with steam passed through it, is then admitted through the pipe $i$, which passes through the pipe $h$, its termination projecting beyond the pipe $h$, as shown at Fig. 1. When bicarbonate of soda begins to be precipitated the vessel A is kept at a temperature of about 125° Fahrenheit. During the operations hereinbefore described the vessel A is kept revolving so as to constantly expose fresh surfaces of the salt and water, or solution of salt, to the action of the ammonia and carbonic acid, and the exposure of fresh surfaces may be further increased by placing perforated disks or plates of metal or other substance, or a series of arms, inside the vessel. The admission of carbonic acid is continued until absorption ceases, and it is to be understood that one or both of the pipes $a\ b$, connecting the vessel A with the vessel B, are in open communication between the two vessels A and B during the whole time that ammonia and carbonic acid are admitted to the vessel A, so that any portion of them which escapes absorption in the vessel A may pass over to act upon a charge of salt, water, and ammonia in the vessel B. It is desirable that the quantity of water in the vessel B should be less than three hundred parts to the one hundred of salt, in the proportion that water is supplied thereto from condensed steam which passes over from the vessel A during the liberation of carbonic acid from the bicarbonate of soda; and this remark also applies to any water which may be supplied as condensed steam from the ammonia-still. After the absorption of ammonia and carbonic acid is complete the rotation of the vessel A is stopped, and after allowing the bicarbonate of soda to settle the solution of muriate of ammonia is discharged, through the cock $k$ and a pipe temporarily coupled thereto, directly or through a close filter, back into the ammonia-still to produce ammonia for another operation. The close filter, when used, is so arranged that its connection with the vessel A and the ammonia-still may be shut off when required, and then any bicarbonate of soda deposited therein may be treated by heating the filtering apparatus to drive off carbonic acid and the ammonia to be reutilized. After the solution of muriate of ammonia is run off the bicarbonate of soda remaining in the vessel may be washed either with water, a solution of common salt, or other salt of soda, and allowed to settle, after which the solution resulting from the washing is discharged into the ammonia-still. This washing is not, however, essential. Water is then added to the bicarbonate of soda and compounds of ammonia which remain in the vessel A. The vessel A is then gradually heated by the fire below it, to boil the bicarbonate of soda, and the boiling is continued until the solution is so concentrated that its boiling point is about 222° Fahrenheit. During the concentration to this point ammonia and half the carbonic acid are driven off. Instead of boiling over the fire the mixture of water and bicarbonate of soda and ammonia, as hereinbefore described, steam superheated to 240° Fahrenheit, or still higher, so as to concentrate the solution until the temperature is raised to 222° Fahrenheit, may be admitted into the vessel A; this, also, has the effect of driving off the ammonia and half the carbonic acid. In this latter case, although I prefer it, it is not essential to add water to the bicarbonate of soda and ammonia; but if water is not added the bicarbonate should be heated by the steam to at least 250° Fahrenheit. The ammonia and carbonic acid driven off are passed through a refrigerator, (not shown in the drawing,) thence through the pipes to act on a fresh supply of salt, water, and ammonia in the vessel B. A solution of carbonate of soda remains in the vessel A, to which water may be added to bring the solution to the density required for crystallization, after which the solution is run off to the crystallizing-pans. If dry carbonate of soda is required the solution may be taken to a drying-furnace. The solution of carbonate of soda as it is discharged from the vessel A contains some iron. This may be separated, if required, by any well-known or convenient method; or, to prevent the soda from being contaminated with iron, the interior of the vessel may be coated with tin, which is less affected than iron during the process.

In place of arranging the vessels A, B, and C to revolve in bearings as hereinbefore described, they may be carried on anti-friction rollers. Instead of using apparatus constructed of iron, as hereinbefore described, in which to conduct my said process of manufacturing carbonate of soda, stationary air-tight vessels formed of slabs of stones may be substituted therefor, and the agitation is effected by stirrers, preferably of wood, fixed to a revolving shaft situate within each such vessel. With such apparatus the successive steps of the process may be conducted in the manner hereinbefore described in reference to revolving iron vessels, and the precautions explained in connection therewith also apply to this last-described apparatus.

Claims.

1. The boiling with water of the bicarbonate of soda mixed with compounds of ammonia, or heating it by steam, so as to reduce it to carbonate of soda by driving off and recovering a portion of the carbonic acid and the residual compounds of ammonia, in the manner hereinbefore described.

2. The manufacture of carbonate of soda in the manner and by the means substantially as hereinbefore described, so that all the ammonia or compounds of ammonia are always kept within air-tight apparatus.

In witness whereof I have signed my name to this specification in the presence of two subscribing witnesses.

JAMES YOUNG. [L. S.]

Witnesses:
JOHN BROWN,
JOHN C. MACANDIE.